(12) United States Patent
Merwarth et al.

(10) Patent No.: US 8,522,240 B1
(45) Date of Patent: Aug. 27, 2013

(54) SYSTEMS AND METHODS FOR COLLABORATIVE TASK MANAGEMENT

(75) Inventors: Michael Merwarth, San Antonio, TX (US); Gary Ricks, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1464 days.

(21) Appl. No.: 11/584,221

(22) Filed: Oct. 19, 2006

(51) Int. Cl.
  G06F 9/46 (2006.01)
  G06Q 10/00 (2012.01)
  G06Q 30/00 (2012.01)
  G06Q 40/00 (2012.01)

(52) U.S. Cl.
  USPC ........... 718/100; 718/101; 718/102; 718/103; 705/301; 705/7.36; 705/7.41; 705/26.82; 705/44; 715/700

(58) Field of Classification Search
  None
  See application file for complete search history.

(56) References Cited

U.S. PATENT DOCUMENTS

| | | | | |
|---|---|---|---|---|
| 5,179,702 | A * | 1/1993 | Spix et al. | 718/102 |
| 7,395,552 | B2 * | 7/2008 | Taylor et al. | 726/28 |
| 7,587,677 | B2 * | 9/2009 | Yamamoto et al. | 715/752 |
| 8,347,295 | B1 * | 1/2013 | Robertson et al. | 718/103 |
| 2002/0052773 | A1 * | 5/2002 | Kraemer et al. | 705/9 |
| 2002/0107901 | A1 * | 8/2002 | Hay | 709/102 |
| 2002/0143592 | A1 * | 10/2002 | Nishikawa et al. | 705/7 |
| 2002/0174134 | A1 * | 11/2002 | Goykhman | 707/104.1 |
| 2002/0174417 | A1 * | 11/2002 | Sijacic et al. | 717/147 |
| 2003/0074387 | A1 * | 4/2003 | Tanaka | 709/103 |
| 2003/0088534 | A1 * | 5/2003 | Kalantar et al. | 706/50 |
| 2004/0001215 | A1 * | 1/2004 | Kurotsu | 358/1.13 |
| 2004/0117528 | A1 * | 6/2004 | Beacher et al. | 710/111 |
| 2004/0158831 | A1 * | 8/2004 | Amano et al. | 718/100 |
| 2006/0010051 | A1 * | 1/2006 | Sattler et al. | 705/32 |
| 2006/0036461 | A1 * | 2/2006 | Chuah et al. | 705/1 |
| 2006/0041456 | A1 * | 2/2006 | Hurewitz | 705/7 |
| 2006/0193006 | A1 * | 8/2006 | Lawrence et al. | 358/1.16 |
| 2006/0235730 | A1 * | 10/2006 | Politano et al. | 705/4 |
| 2006/0288033 | A1 * | 12/2006 | Raz | 707/102 |
| 2007/0005413 | A1 * | 1/2007 | Hennings et al. | 705/9 |
| 2007/0005800 | A1 * | 1/2007 | Banks et al. | 709/238 |
| 2007/0143165 | A1 * | 6/2007 | Roberts et al. | 705/8 |
| 2007/0192402 | A1 * | 8/2007 | Dean et al. | 709/202 |
| 2008/0027778 | A1 * | 1/2008 | Srinivasan et al. | 705/8 |
| 2008/0028031 | A1 * | 1/2008 | Bailey et al. | 709/207 |

OTHER PUBLICATIONS http://www.basecamphq.com/, (Accessed: Oct. 18, 2006), 4 p.

(Continued)

Primary Examiner — Emerson Puente
Assistant Examiner — Adam Lee
(74) Attorney, Agent, or Firm — Brooks, Cameron & Huebsch, PLLC

(57) ABSTRACT

Systems and methods for collaborative task management are described. The apparatus may include a user interface module that provides a graphical user interface to a user, a form engine coupled to the user interface module to receive form data from a task data store, a scheduling engine that schedules task assignments, and the task data store that stores information related to one or more tasks. The method may include receiving from a user a request to update a task assignment, displaying to the user a task assignment form, receiving an indication to process the form, updating a task data store with information from the form. The method may alternately include receiving task information from a plurality of users, prioritizing task assignments using that information, generating one or more work queues, providing a work queue to a user, receiving an update to a task assignment, and re-generating the work queue.

21 Claims, 10 Drawing Sheets

(56) References Cited

OTHER PUBLICATIONS

"Designing a Collaborative Task Manager", http://nuit-blanche.blogspot.com/2006/07/designing-collaborative-task-manager.html, (Jul. 4, 2006),3 p.

Chen, F., "A Collaborative Project Management Architecture", *Proceedings of the IEEE 36th Hawaii International Conference on System Sciences*, (2003),1-12.

Gillner, R., et al., "Collaborative Project Management with a Web-Based Database Editor", *Proceedings of the Fifth International Workshop on Multimedia Information Systems*, Indian Wells, California,(Oct. 21-23, 1999),72-79.

Kreifelts, T., et al., "Sharing To-Do Lists with a Distributed Task Manager", *Proceedings of the Third European Conference on Computer-Supported Cooperative Work*, Milano, Italy,(Sep. 15-17, 1993),16 p.

\* cited by examiner

File   Edit   Window

ADD NEW ASSIGNMENT

ASSIGNMENT: New Task

SUBMIT FORM    CANCEL

STATUS: In Process
- In Process
- Complete
- Pending

PRIORITY: Major
- Low
- Minor
- Major

ASSIGNMENT CATEGORY
- AUDIT
- UW-POLICY
- PORTFOLIO MANAGEMENT
- TECHNICAL ANALYSIS
- TECHNICAL DEVELOPMENT
- SUPPLIER MANAGEMENT

LEADS/WORKERS

LEAD: Ricks
- Brewer
- Ricks
- MacIntosh

WORKER 1: Brewer
- Adams
- Brewer
- Ricks

WORKER 2: Lindsey
- Ricks
- MacIntosh
- Lindsey

WORKER 3: Smith
- Lindsey
- Smith
- Turner

WORKER 4: Adams
- Adams
- Brewer
- Ricks

EXPECTED OUTCOME

NEXT STEPS

NOTES

DATES
Start Date:
Completion Date:
Last Updated

PROJECT INITIATOR: Michael Merwarth

SYSTEMS AND METHODS FOR COLLABORATIVE TASK MANAGEMENT

TECHNICAL FIELD

This application relates to systems and methods that manage software application security and more particularly to systems and methods that manage the authentication credentials used by background software applications.

BACKGROUND

Companies seeking to increase their profit margins continually strive to both drive down costs and increase the productivity of their workforce. It does not matter if a worker is an assembly line worker responsible for putting the finishing touches on a manufactured product or if they are a graphic designer; the more that any of these workers can do means more revenue to the company that employs them, and in turn, greater profits.

There are multitudes of ways to manage workers. Some involve nothing more than a manager whose entire job is to walk around and ensure that the line workers are actually doing something. Others involve enforcing quotas of production, and encouraging over-achievement. A survey of 100 companies will probably yield almost 100 distinct ways of managing workers. In their simplest forms, these distinct ways have some commonality in that they all track the completion of tasks.

SUMMARY

In an embodiment, collaborative task management is performed by an apparatus that includes one or more software modules, including, a user interface module that provides a graphical user interface to a user, a form engine coupled to the user interface module to receive form data from a task data store, a scheduling engine that schedules task assignments, and the task data store that stores information related to one or more tasks. The apparatus may also include a report engine coupled to the scheduling engine. In an alternative embodiment, collaborative task management is accomplished by a method that includes receiving from a user a request to update a task assignment, displaying to the user a task assignment form, receiving an indication to process the form, updating a task data store with information from the form. In yet a further embodiment, collaborative task management is accomplished by a method that includes receiving task information from a plurality of users, prioritizing task assignments using that information, generating one or more work queues, providing a work queue to a user, receiving an update to a task assignment, and re-generating the work queue.

BRIEF DESCRIPTION OF DRAWINGS

Embodiments are illustrated by way of example and not limitation in the figures of the accompanying drawings, in which like references indicate similar elements and in which:

FIG. 2D shows an example user interface for the addition of a new task, in accordance with an example embodiment;

FIG. 2E shows an example user interface for the management of one or more tasks, in accordance with an example embodiment;

DETAILED DESCRIPTION

The following detailed description is divided into four sections. The first section presents an overview of embodiments of the inventive subject matter with reference to a system for software application security management. The second section presents apparatus and systems according to embodiments. The third section provides methods of using example embodiments of the inventive subject matter. The fourth section describes an example system implementation and an alternative system implementation of the inventive subject matter.

OVERVIEW

Figure 1:
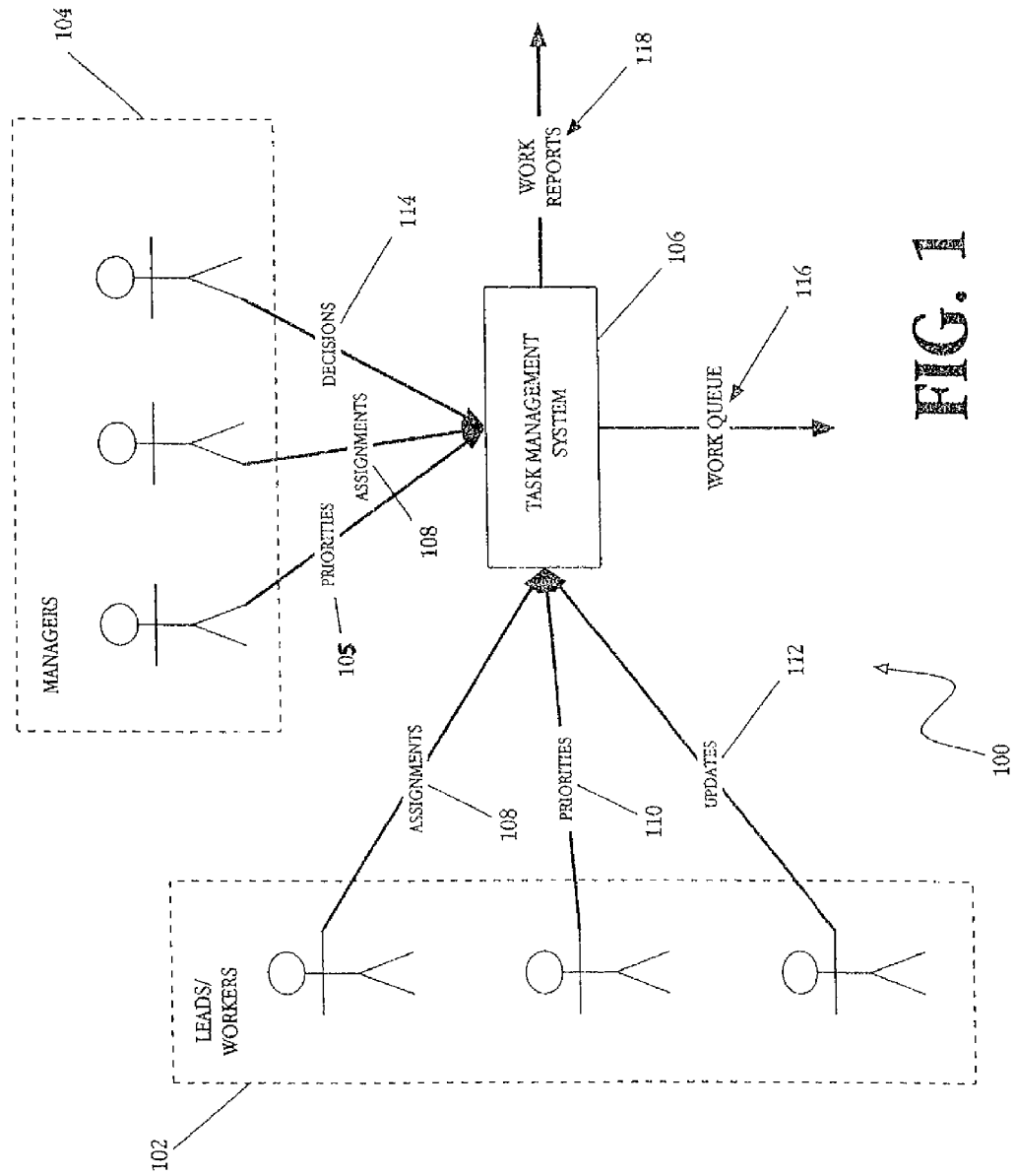
FIG. 1 shows a high-level block diagram of a system of collaborative task management, in accordance with an example embodiment.

FIG. 1 shows a high-level block diagram of a system of collaborative task management, in accordance with an example embodiment. The system 100 includes one or more task leads/workers 102, one or more managers 104 and a task management system 106. The leads/workers 102 include both workers who lead a particular task and workers who perform discrete portions of a particular task. The managers 104 manage one or more leads/workers 102, and interact with other managers 104 when additional leads/workers 102 are needed to accomplish a project that they are managing.

Each of the leads/workers 102 input assignments 108, priorities 110, or updates 112 into the task management system 106. A lead for one particular task may be a worker for another task. When the lead/worker 102 is a lead for a particular task, they can input all three types of information into the task management system 106. When the lead/worker 102 is merely working, and not leading, on a particular task, their ability to input information into the task management system 106 may be limited to inputting updates 112 into the task management system 106, in some examples. Depending on the structure of a particular organization, managers 104 may also be used as workers or leads for particular tasks. In such a case, the manager 104 would be constrained by any limitations that may be imposed on other workers for that task.

Each of the managers 104 input assignments 108, priorities 110 or decisions 114 into the task management system 106. Each of the managers 104 has responsibility for one or more leads/workers 102, in some examples. The manager 104 may alternatively be in charge of a particular functional area, drawing on a pool of leads/workers 102 on an as-needed basis. For example, the manager 104 may be responsible for management of relationships with one or more states in regards to auto insurance underwriting. This manager's main task is to work with those states to ensure that the manager's company, in this example an auto insurance company, can legally operate and sell insurance products there. In order to support this goal, the manager 104 may need to periodically gather information in regards to present customers, or potential market. Instead of the manager 104 performing such a task, the manager 104 may bring one or more leads/workers 102 on board to perform and complete the task. Each of the leads/workers 102 may have a supervisor who generally supervises their work, but in this case the manager in need of auto insurance information would exercise some task management over them.

As the previous example shows, one lead/worker may be working with several different managers during their daily work. Compounding the problem, as discussed above with reference to the definition of a lead/worker, the lead/worker may also lend support to other leads/workers so they can complete their own tasks. Though such an arrangement offers many opportunities for the leads/workers 102 to be productive in the organization, it creates a large problem for the organization. What one lead/worker 102 considers important may not necessarily be important for the organization. Further, what one manager 104 considers the most important thing that the organization is doing may be considered unimportant by every other manager 104 in the organization. In such a scenario, the lead/worker 102 will experience conflict as they explain to those other managers that the first manager has them dropping everything for their pet project.

The task management system 106 provides control in this scenario, and can be extended to other areas, so that the individual tasks of each of the leads/workers 102 can be managed, tracked and quantified. The task management system 106 is configured to provide the managers 104 and the leads/workers 102 the ability to manage a plurality of tasks across the organization. Additionally, the task management system 106 provides to the managers 104 the ability to view the priorities of the work queues 116 across any number of leads/workers 102. By viewing the work queues 116, the managers 104 can re-prioritize tasks globally. The task management system 106, as will be described below, can re-order the work queues 116, which will in turn re-order the work queue for each of the leads/workers 102 affected by the change. The task management system 106 can also be configured, in some examples, to maintain a data store of information with regards to completed and in-process tasks. Through this functionality, the task management system 106 can prepare and deliver work reports 118 to the managers 104, the leads/workers 102, or both. The work reports 118 can be delivered periodically, or can be generated dynamically based on information requested. In the latter case, as more information is collected and stored by the task management system 104, the work reports 118 can be used to data mine information with regards to completed and in-process tasks. This can be used to identify inefficiencies in the organization, regardless of whether they are at a personal, a workgroup, or at a global level. These work reports can also be used to determine where additional personnel may be needed.

Systems

Figure 2A:
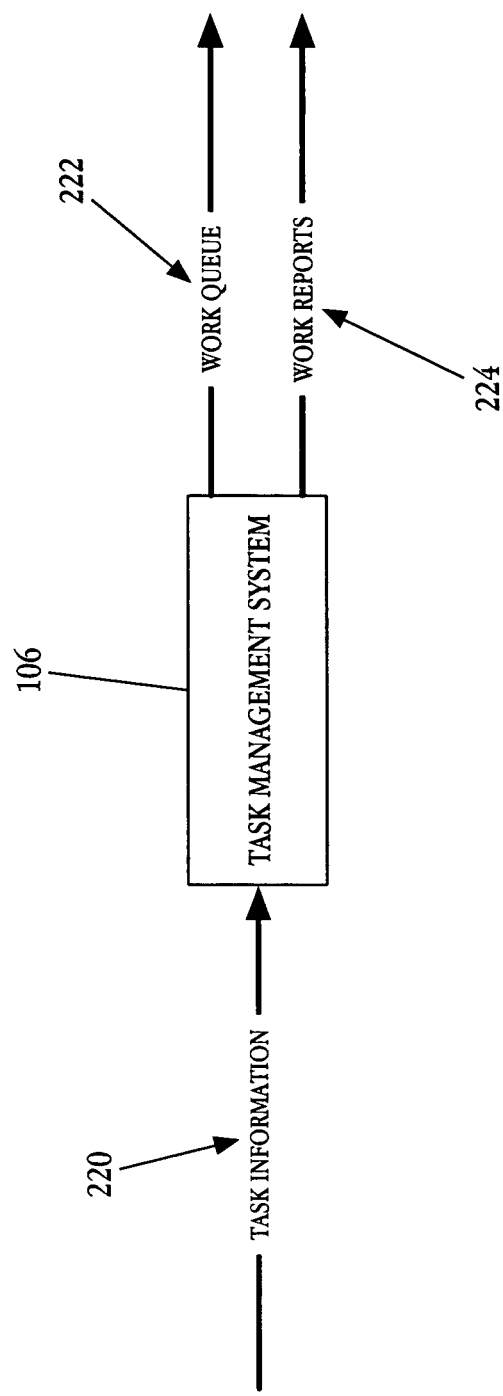
FIG. 2A shows a high-level block diagram of an apparatus for providing collaborative task management, in accordance with an example embodiment.

FIG. 2A shows a high-level block diagram of an apparatus for providing collaborative task management, in accordance with an example embodiment. In an embodiment, the task management system 106 produces one or more work queues 116 and one or more work reports 118, as discussed above. The task management system 106 produces these outputs using task information 220. Task information 220, as used with reference to FIG. 2A and the present discussion, represents collectively the assignments 108, priorities 110, updates 112 and decisions 114 discussed above with respect to FIG. 1.

In an embodiment, the task management system 106 processes the task information 220 to determine a work queue 114. The task management system 106 may receive the task information 220 from a lead/worker 102 or from a manager 104, in some examples. In the former example, the lead/worker 102 may be supplying an update 112 to a task that has already been assigned to them. In such an example, the lead/worker 102 can indicate that they are now 50% complete on the task. The manager 104 receiving that information, either through an updated work queue or a status message, can decide that with the task being 50% complete its priority is no longer as high as it once was. The manager can provide this re-prioritization to the task management system 106, which re-generates and updates the work queue 222, which may update the individual work queue for that lead/worker 102. The work queue 222 may include an individual lead/worker's work queue, the work queue for a group of workers, the work queue for the entire organization, or any combination thereof. As several managers 104 discuss among themselves the relative priority of tasks in the group or organization work queue, and re-assess those priorities, the priorities for the individual lead/worker's work queue may change. Updates to the priority over a group of lead/workers 102 by the managers is one example of task information received from the managers, as discussed above with respect to FIG. 1.

In another embodiment, the task management system 106 outputs a work report 224. These may be requested by one or more managers 104, in some examples, or generated and delivered periodically by the task management system to one or more managers 104. In the former example, a manager 104 may request to see the relative productivity over the last year of the leads/workers that they supervise. The task management system 106 can data mine through the stored task information and generate any number of metrics that measure the relative productivity of the leads/workers. It may include an indication of the average time it took the lead/worker to complete tasks assigned to them, how many tasks they completed during the previous year, how many tasks they were assigned, how many tasks they led to completion, and anything that could be a measure of their productivity. As will be understood by those skilled in the art, the efficacy of such reports increases as more and more information is input and stored within the task management system.

Figure 2B:
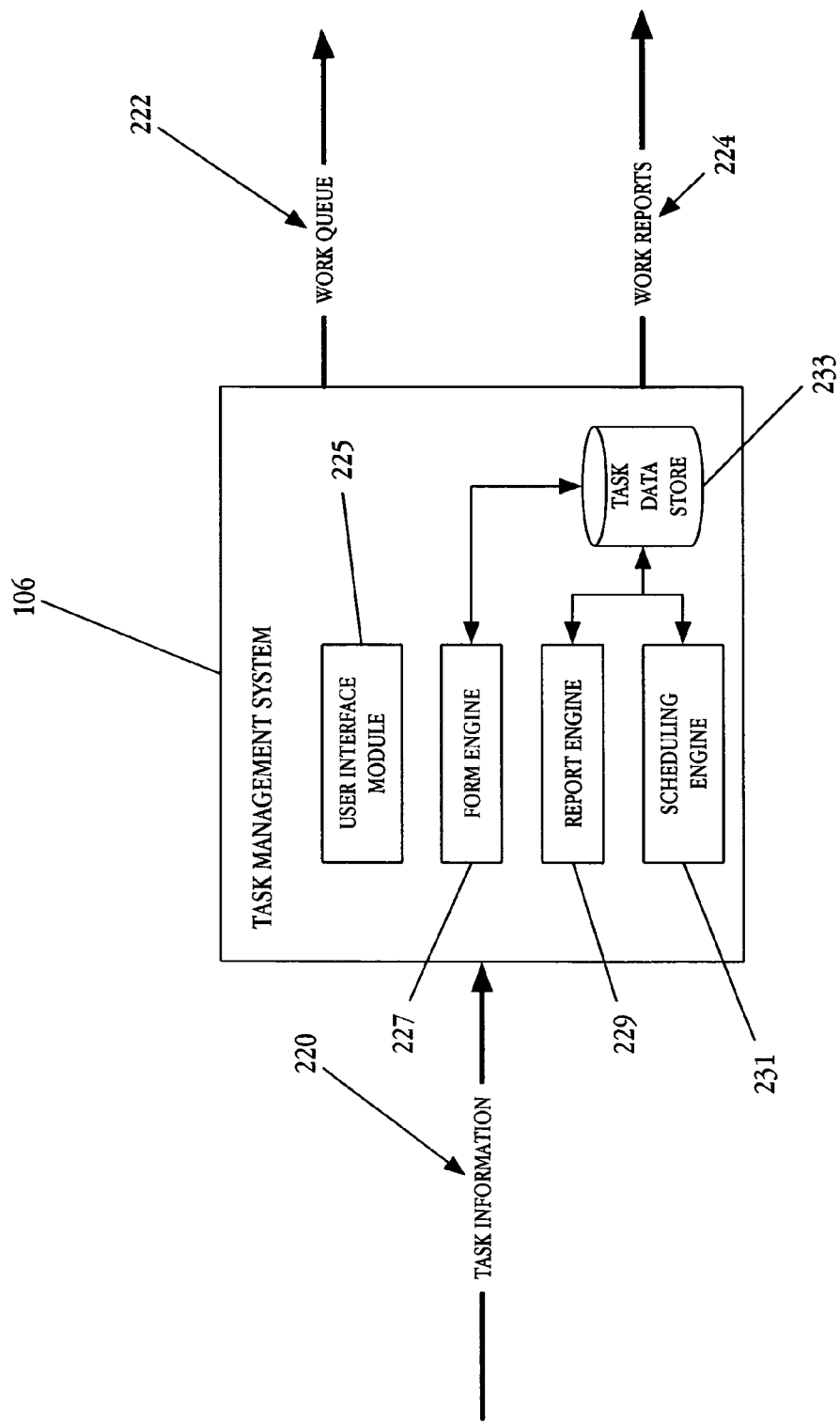
FIG. 2B shows a more detailed block diagram of an apparatus for providing software application security management, in accordance with an example embodiment.

FIG. 2B shows a more detailed block diagram of an apparatus for providing software application security management, in accordance with an example embodiment. In an embodiment, the task management system 106 includes a user interface module 225, a form engine 227, a report engine 229, a scheduling engine 231, and a task data store 233.

In an embodiment, the user interface module 225 is configured to provide a graphical user interface to a user for the purpose of the user entering information into the task management system 106 and to display to the user the status of one or more tasks, including work reports and work queues.

In an embodiment, the form engine 227 is configured to receive form data from the task data store 233. The form data defines information needed to populate at least a portion of a task entry in the task data store 233, in one example. The form data includes, in some examples, instructions that cause the user interface module 225 to execute a graphical user interface displaying the form and providing entry fields for the user to supply information. In a further embodiment, the form engine 227 is configured to read the user information and pre-populate the form on an as-needed basis. For example, once the user is identified, specific information about them need not be entered, reducing the time that the user must spend performing tasks through the task management system 106. The form engine 227, in other embodiments, is additionally configured to filter one or more fields of data using the user identification. Filtering includes, without limitation, suppressing the display of selectable information in a text entry field so that the user is not displayed the information and cannot select it. For instance, in the general field of insurance underwriting, if the user were an underwriter for auto insurance, providing category information related to health insurance would unnecessarily clutter the user's display with information they do not need. Such filtering may be overridden by the user in some examples, providing the user the ability to enter any information into the form.

In an embodiment, the task data store 233 stores information related to the tasks, users and workgroups. This information may include, without limitation, task name or description, task lead, manager responsible for the task, manager responsible for the task lead, department, workers supporting the completion of the task, category of the task, completion notes, time entries, and the like. The completion notes may be tied to time entries in some examples, such that the user entering the time they spent on a particular task during the day can also note what they performed in support of that time entry and what steps are needed next. In an alternate embodiment, the task data store 233 may be coupled to a timing device through the task management system 106 so that when a user notes that they are beginning work on a particular task, the timer can record the exact time they spent on that task. Such functionality can be used to more granularly monitor the user's productivity, or in some examples, function as the time card for a user, should that user be an hourly employee.

In a further embodiment, the task data store 233 contains additional data tables for user information, category information, standard task information for tasks which are performed routinely, and the like. An example data structure of tables contained within the task data store 233 is discussed below with respect to FIG. 2C.

In an embodiment, the scheduling engine 231 is configured to retrieve information from the task data store 233 related to the work queue of one or more leads/workers 102 for the purpose of auto-assignment of a task. This can be a first level assignment, in some examples, which may be overridden by a manager. In other examples, the scheduling engine 231 determines which of a group of workers has the lightest workload based on number of estimated hours to complete all assigned tasks, or some other metric, and auto-assigns a newly received task to the least loaded worker.

In an embodiment, the report engine 229 is configured to data mine the task data store and provide work reports to one or more users. Data mining techniques are well known in the art, and are considered to be outside the scope of the present discussion, except insofar as any suitable data mining techniques can be used to retrieve information from the task data store. The report engine 229 may be coupled to the scheduling engine, in some examples, and report queries may be executed on a periodic basis to generate one or more work reports to be delivered to the one or more users.

Figure 2C:
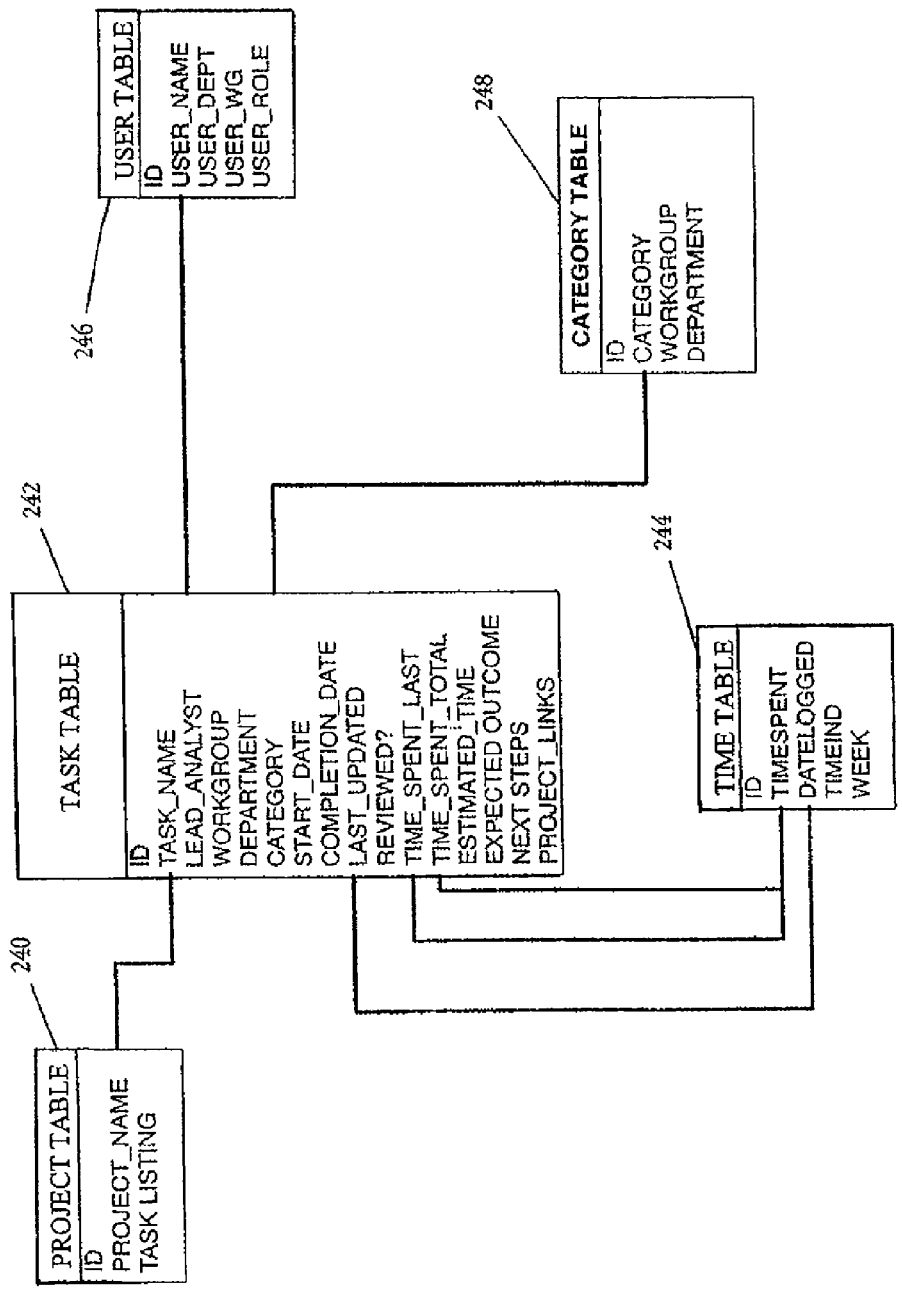
FIG. 2C shows an example data structure of a task data store, in accordance with an example embodiment.

FIG. 2C shows an example data structure of a task data store, in accordance with an example embodiment. This is just one example of an arrangement of tables in the task data store 233, and is not exclusive of other arrangements. The task data store 233 may include a project table 240, a task table 242, a time table 244, a user table 246 and a category table 248.

The project table 240 provides, in one example, a global grouping of one or more tasks in support of a project. Though much of the present discussion is related to discrete tasks and not logical grouping of tasks, the grouping of individual tasks under the moniker of a project does not depart from the scope of the present discussion. As such, the project table 240 provides this type of logical grouping.

The task table 242 provides a record table to record information about each of the tasks managed by the task management system 106. This includes, without limitation, lead analysis, workgroup, start date, completion data, time spent, expected outcome, next steps and project links. This listing is merely illustrative and is not exclusive of other descriptions within this application in relation to the task data store 233. The "next steps" entry in the task table 242 provides a running listing of the next steps required to complete the task, and any further entry into this row will not overwrite previous entries such that the most recently added next step is at the top of the field and the list of next steps then descends in reverse chronological order. Project links provides hyperlinked documents that can be retrieved over a local-area network (LAN) or over a wide-area network (WAN), such as the Internet.

The data structures and relationships shown in FIG. 2C are examples, and the inter-relationships shown may be further augmented by other data shown or not shown in FIG. 2C without departing from the scope of the present discussion.

Figure 2E:
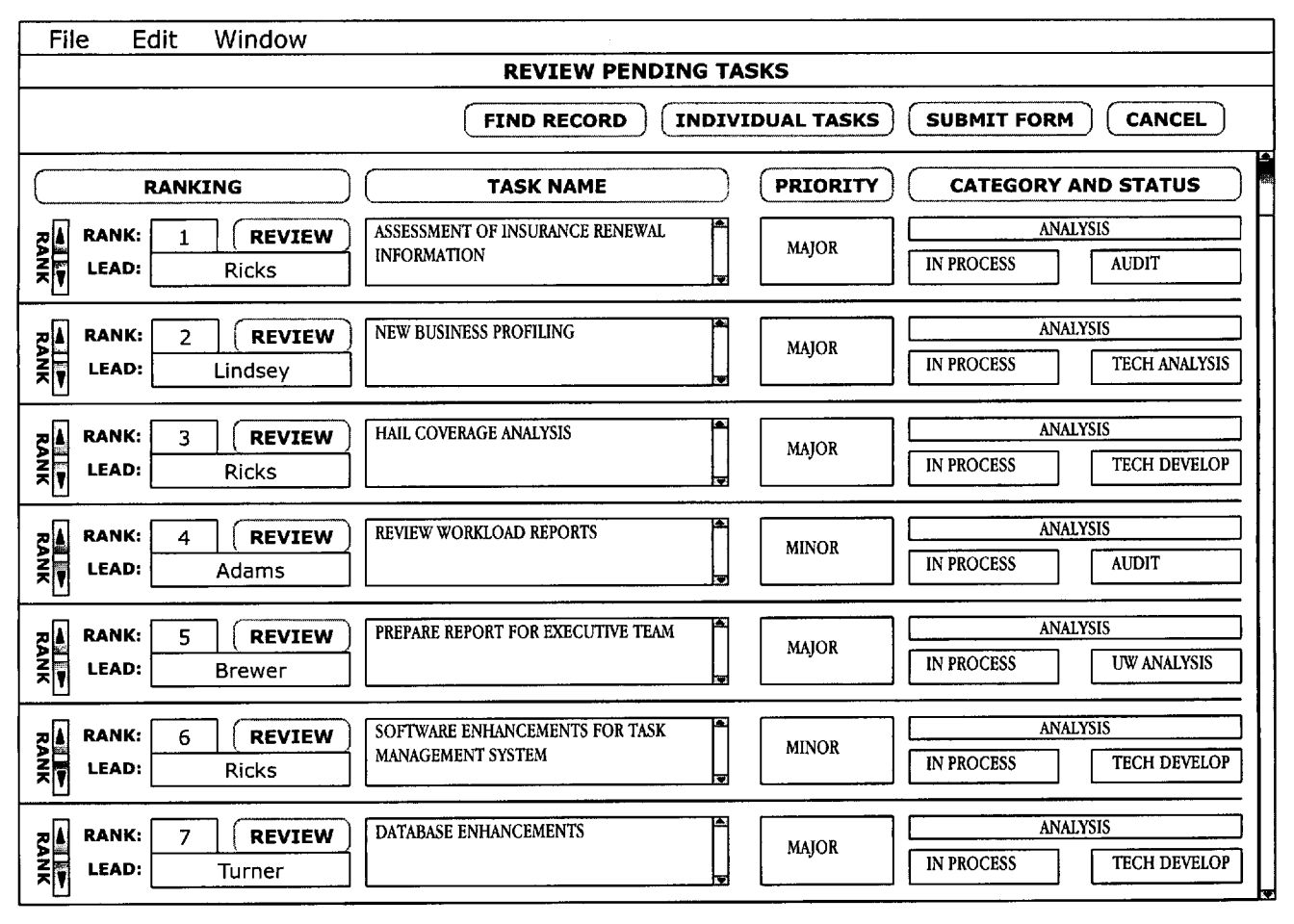

FIGS. 2D and 2E show example user interfaces for the addition of a new task, in accordance with an example embodiment. In an embodiment, the user interfaces shown in FIG. 2D and FIG. 2E are generated by the user interface module 225 described above. The user interface generated by the user interface module 225 can be sent over a network to a computing device operated by a user and then displayed on a suitable display device, in one example. In an alternate example, the user interface module 225 can be implemented at least in part on a computer device operated by the user. In such an example, the user interface generated by the user interface module 225 can be sent to the display device coupled to the computer device.

The user interface shown in FIG. 2D is one example of a user interface for adding a new task to the task management system 106 and is illustrative of the concepts described herein. This user interface is not meant to be limiting in any manner, as logical re-arrangement of the elements can be made without departing from the scope of the present discussion. Additionally, the user interface can be implemented in a suitable auditory fashion for users who have a visual disability. In such a case, the elements shown in FIG. 2D may be provided audibly to the user. However, in all cases, the user interface is generated to provide information to the user about the task they are adding to the system and to capture data from the user that can be added to the task management system.

In an embodiment, the user interface includes entry fields for assignment name, status, priority, leads/workers, category, expected outcome, next steps, notes, dates and project initiator. The user interface may include additional entry fields for additional information without departing from the scope of the present discussion. The user interface additionally includes selection buttons which allow the user to submit or cancel the form. Once the user submits the form, the data provided will be added to a new entry in the task data store 233. The user interface shown in FIG. 2D may also be used for updating information about a particular assignment.

The leads/workers entry area of the user interface tracks which user is designated as lead for the project, and which users are designated as workers in a support role. As can be seen from the selection possibilities in this area of the user interface, the leads/workers can assume either a lead role or a worker role. The selection of users in this example is an alphabetized listing of leads/workers. In one example, based on the user logged into the system, this listing of leads/workers can be filtered to show only the leads/workers that are within the same functional grouping of leads/workers as the user. This has the advantage of speeding up the selection process of leads/workers, as the number of choices can be reduced. However, this filtering may be overridden in cases where the user entering information in the form may want to select leads/workers from the entire organization. Likewise, the assignment category can be pre-filtered to include only categories that are reasonable for the specific user entering information into the form.

As discussed above, the form may have fields where the data that is selectable by the user is pre-filtered based on the user information. In an embodiment, the task management system 106 operates on a network requiring authenticated login by users. In such an example, the user is identified prior to being given access to any software applications on their computing device. Through this identification, information about the user can be known to the task management system 106. This may include, without limitation, the department, workgroup, identity and other assorted information. The task management system 106 is configured, in one example, to read that information and make a determination about what fields can be pre-filtered and how to pre-filter those fields. For example, a manager may have the ability to select from more categories than a lead/worker. Additionally, the task management system 106 can pre-populate data fields, in some examples, based on the user information. This may simply be the pre-population of the project initiator field in the case of a new assignment. This field can be pre-populated with the name of the user who is using the form. Other data can be pre-populated as well, in other examples, such as pre-populating the lead field with the user's name, pre-populating the status field with "in process", pre-populating the start date field with today's date, and/or pre-populating the last updated field with today's date. In some cases, pre-populated data can be overridden by the user filling out the form. In other cases, such as the last updated field, it may be advantageous for the user not to have the ability to override that selection.

In an embodiment, FIG. 2E shows an example user interface for managing tasks. Through the use of this user interface, a manager can re-prioritize tasks. The example shown in FIG. 2E shows seven discrete tasks being performed by the workgroup. The tasks are ordered in priority from 1 to 7, with the task "Assessment of Insurance Renewal Information" having the highest priority ranking. The priority ranking re-order bar to the left of each of the entries provides the user with the ability to either decrease or increase the priority ranking of the task, in one example. In such an instance, all priority rankings of the other tasks are dynamically re-calculated so that is the first priority task is decreased to the second, the second priority task would dynamically be re-calculated as the first priority ranking in the list. For instance, if the manager decides that the task with the highest priority ranking is no longer quite as important, they can select the down-ranking arrow, in one example. The user could additionally select the text field and enter a priority ranking number. Overview information may also be provided in the user interface, as shown in the example of FIG. 2E. Such information may include, without limitation, task name, priority, category, status, and the like.

In a further embodiment, the user interface shown in FIG. 2E can be shared among more then one manager. As discussed above, in a collaborative work environment, leads/workers may be working on projects for many different managers. All of those managers could use the user interface either singly or in groups to re-prioritize the tasks within the workgroup. This might be done virtually, where the managers share a screen such as that shown in FIG. 2E and interact using a voice conference, or it might be done physically at meetings. One example of the latter may be a weekly round-up meeting where all managers in a workgroup get together to determine the priorities for the week. By using the user interface shown in FIG. 2E, the actual assignments being performed by the leads/workers in the workgroup can be re-ordered. Not shown in FIG. 2E is a listing of all tasks for a particular lead/worker. The user interface for such a listing may be similar to that in FIG. 2E, without the ability to reorder tasks. Such a user interface may be one implementation of a work queue for a lead/worker, in some embodiments. Where the priority of the assigned tasks is to change because of input from one or more managers, the work queue of the individual lead/worker would be changed appropriately. Through this functionality, the lead/worker can report to work every morning and see a work queue that has been tailored to meet the workgroups goals. Without this functionality, the lead/worker is forced to make individual decisions as to what projects are important to work on. Though the lead/worker would likely make such decisions, their impressions of the workgroup's priorities may differ from the manager's decisions.

Methods

Figure 3:
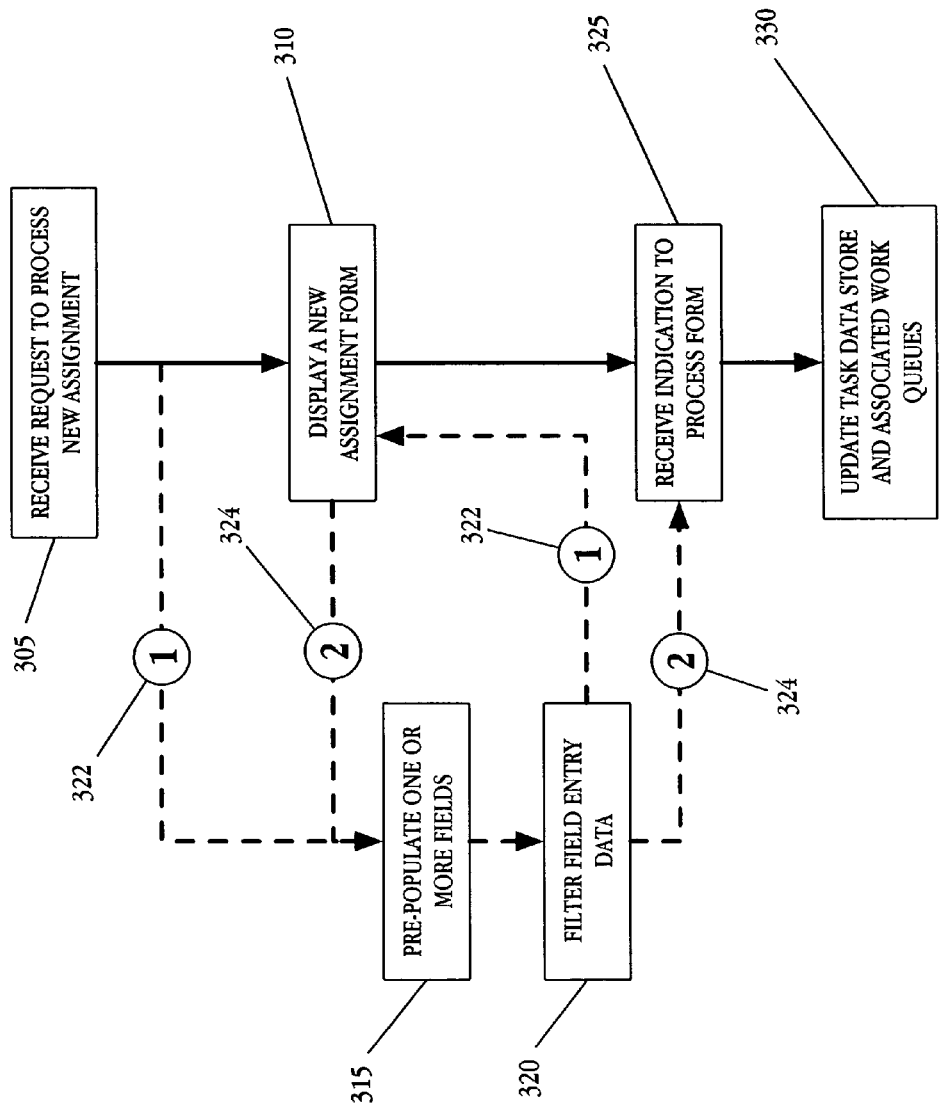
FIG. 3 shows a flowchart of a method of providing task information, in accordance with an example embodiment.

FIG. 3 shows a flowchart of a method of providing task information, in accordance with an example embodiment. In an embodiment, the method shown in FIG. 3 can be carried out on a task management system 106 as described above. The method shown in FIG. 3 is one method of adding a task, or assignment, to the task management system.

At block 305, a request is received from a user to process a new assignment. The user may include, without limitation, a lead/worker, or manager. At block 310, a new assignment form is generated by the user interface module 225 and displayed to the user. As discussed above, the form may be pre-populated with data in one or more fields at block 315, and selectable data may be filtered prior to display at block 320. These operations may occur prior to or after the displaying operation at block 310, without exclusion. Both operational flows are shown in FIG. 3. Where the operations at block 315 and block 320 occur prior to the generation and display of a new assignment form at block 310, the process flow is shown as Option 1 in FIG. 3. Where the operations at block 315 and block 320 occur after the generation of the form at block 310, the process flow is shown as Option 2 in FIG. 3. In the latter example, first the form is generated and displayed to the user, and then data is retrieved and populated into one or more fields in the form. Though technically not occurring prior to the task of generating the form, in the interests of simplicity in the present discussion, both operations will be called pre-populating, regardless of their execution before or after the operations at block 310.

At block 325, an indication from the user is received that they wish to submit the form. This may be accomplished by the user selecting and clicking the submit form button shown in the user interface example of FIG. 2D. At block 330 the data entered into the form is then sent to the task data store 233, which is updated with the new assignment. Additionally, the task data store 233, in some examples, may update the ordering of currently pending assignments so that the individual and workgroup work queues can be re-ordered accordingly. In one example, work queues are not re-ordered when a new assignment is added to the task data store 233 as the priority of that particular assignment relative to other assignments has not been properly evaluated. This may be the case when a lead/worker has added a new assignment themselves. Alternatively, where a manager is adding a new assignment to the task data store 233, they may choose to provide a priority ranking of the new assignment, in which case the work queues, both individual and workgroup, can be re-ordered accordingly. In this instance, an addition of a new assignment that has a higher priority ranking than any other assignments in the individual work queue of a lead/worker will result in the re-ordering of that particular individual's work queue. This has the benefit of quickly alerting the lead/worker of a higher priority project that takes precedence over all others.

Figure 4:
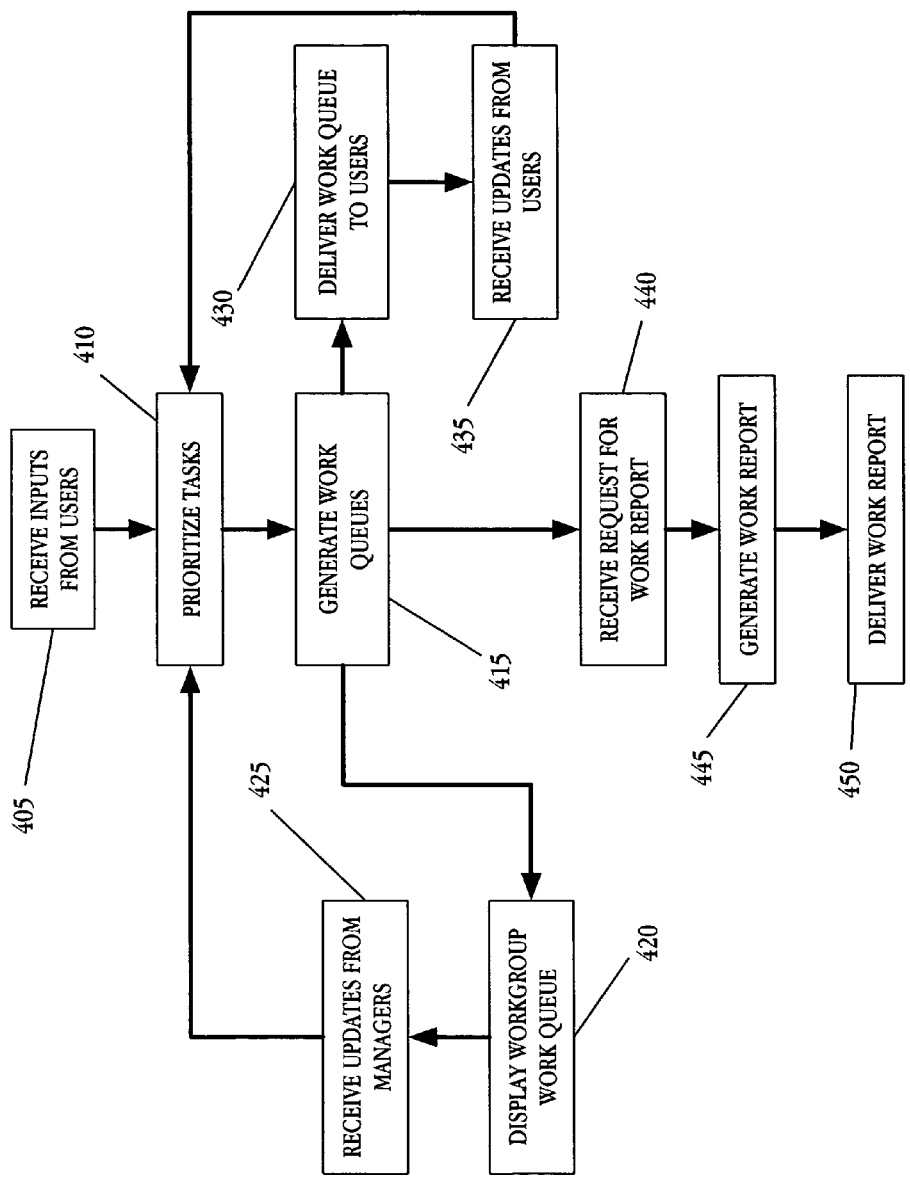
FIG. 4 shows a flowchart of a method of managing tasks and workers, in accordance with an example embodiment.

FIG. 4 shows a flowchart of a method of managing tasks and workers, in accordance with an example embodiment. The method shown in FIG. 4 can be carried out on a task management system 106 as described above, in one example. The method shown in FIG. 4 is an iterative process of receiving inputs, recalculating outputs based on those inputs, and soliciting further inputs from one or more users. The flow shown in FIG. 4 is illustrative and descriptive of an overall flow of information and operations, but is only meant to be illustrative and descriptive of one possible flow for the purpose of discussing the concepts illustrated.

At block 405, one or more inputs are received from a plurality of users. These users may include, without limitation, leads/workers or managers. The inputs are task information detailing one or more aspects of a task assignment and may include, without limitation, task information, task priority ranking, leads/workers assigned to particular tasks, login information about a particular user, and the like. Though information is received in regards to only one task assignment, that task assignment is just one of a plurality of task assignments managed by the task assignment system.

At block 410, tasks are prioritized according to either pre-set rules or according to manager input. In the first example, a pre-set rule could be that any task relating to technical development has a higher priority ranking than any other task. If more than one task related to technical development is being managed by the task management system 106, the task management system 106 may prioritize using a First-In-First-Out (FIFO), or Last-In-First-Out) LIFO approach. In the former, the first task that is entered into the system has the highest priority ranking and every task after it is assigned a lower priority ranking. In the latter, the last task entered into the system is assigned the highest priority ranking, and all other previously received tasks have their priority ranking decreased. In the example of prioritizing tasks according to manager input, tasks are not prioritized except by managers who determine, based on their own experience, the proper priority ranking. In such a system, a task that is entered into the system is held in suspension until reviewed by a manager. One advantage of such a system is that a check of the relevance and importance of a task is made first before work queues are generated at block 415.

At block 415, the task management system 106 generates one or more work queues. In an embodiment, the task management system 106 processes all the information received, as well as other pre-defined and non-received information, such as calendar and holiday information, to generate the work queues. The task management system 106 generates both individual work queues and workgroup work queues. The workgroup work queues are queues that can be managed by one or more managers. In such an instance, the workgroup work queue is displayed or otherwise conveyed to the one or more managers at block 420. The one or more managers provide updates at block 425, and the tasks are again prioritized according to all information at block 410. These updates from managers can include the re-prioritization of a particular task, a change in one or more leads/workers assigned to the task, or any other information about the task. Through this looping functionality, the work queues can be continuously re-generated, providing for up-to-date information according to which the managers can manage the workgroup's current workload.

At block 430, individual work queues are delivered to users. This may be accomplished through any suitable means, such as providing a current work queue to the user when they log into the task management system 106. It may also include emailing the user whenever their individual work queue changes. It could also include delivery through Really Simple Syndication (RSS) feeds to a RSS reader operating on the user's computing device. All of these methods could be used, either individually or in combination, to deliver the work queue to the user. The user may include either leads/workers or managers, or both, in some embodiments.

At block 435, the user provides updates to their assigned tasks. This may include, without limitation, what the user has done to complete the task, time entries, next steps to perform, messages to other leads/workers about the steps that need to be performed by the other leads/workers, expected outcomes for the task, date information, timelines for completion, and the like. The updates received at block 435 are input into the task management system 106 and as discussed above, the work queue for the workgroup is then re-generated.

These two sets of operations, the operations performed by the managers at blocks 420 and 425, and the operations performed by the leads/workers, at block 430 and 435, occur concurrently and asynchronously. As the manager is updating the priority ranking of a particular task, the lead/worker assigned to it may also be updating the record with what they have done. Use of this type of asynchronous system of information gathering provides the leads/workers and managers in a workgroup the ability to respond quickly to changing needs while completing the tasks at hand. This can be done without the need to continuously solicit input as to status, or priority. Such re-prioritization by a committee of managers (or even a single manager) also allows those tasks which are not important to the workgroup to be weeded out instead of draining productivity.

In parallel with the information gathering, updating, and re-generating, the task management system 106 can also deliver work reports on an as-needed basis. As discussed above, the operations depicted in FIG. 4 are performed asynchronously. As such, the work report requested at block 440 will only be a snapshot of the work in the queue at that point in time. However, for management and reporting purposes this may be all that is needed. The work report can be any data mining operation on the task data store 233. Exact data mining techniques are outside the scope of the present discussion and any suitable data mining techniques and output are considered to be within the scope of the present discussion. Following the request for a work report at block 440, the task management system 106 generates the work report at block 445. The work report can be delivered, as discussed above in regard to the work queue for a user, at block 450. The task management system 106 can also periodically generate scheduled work reports, such as end of day/week/month/quarter/year reports. Such reports can be requested by the scheduling engine 231 of the task management system 106. In the case of periodically generated reports, or any non-user-requested report, any delivery mechanism can be used, such as RSS feeds, email delivery, web page delivery, and the like.

Additionally, oher information may also be received as inputs from the users at block 405, apart from the information previously discussed. The additional input can include information not directly related to the task at hand. Such information may include reputation information about users, work performance data for users, user audit information supplied from other users, time card entry information, and the like. This information would not necessarily be entered into a record entry for a particular task, as it has equal applicability to all tasks. However, the user's ability to perform tasks, as evaluated by other users, may affect whether a higher priority ranking task is assigned to them. Through the collection and use of this type of additional data, better assignments of tasks can be made. Such data can also be used as ongoing performance review input for the users.

Example Implementations

Figure 5:
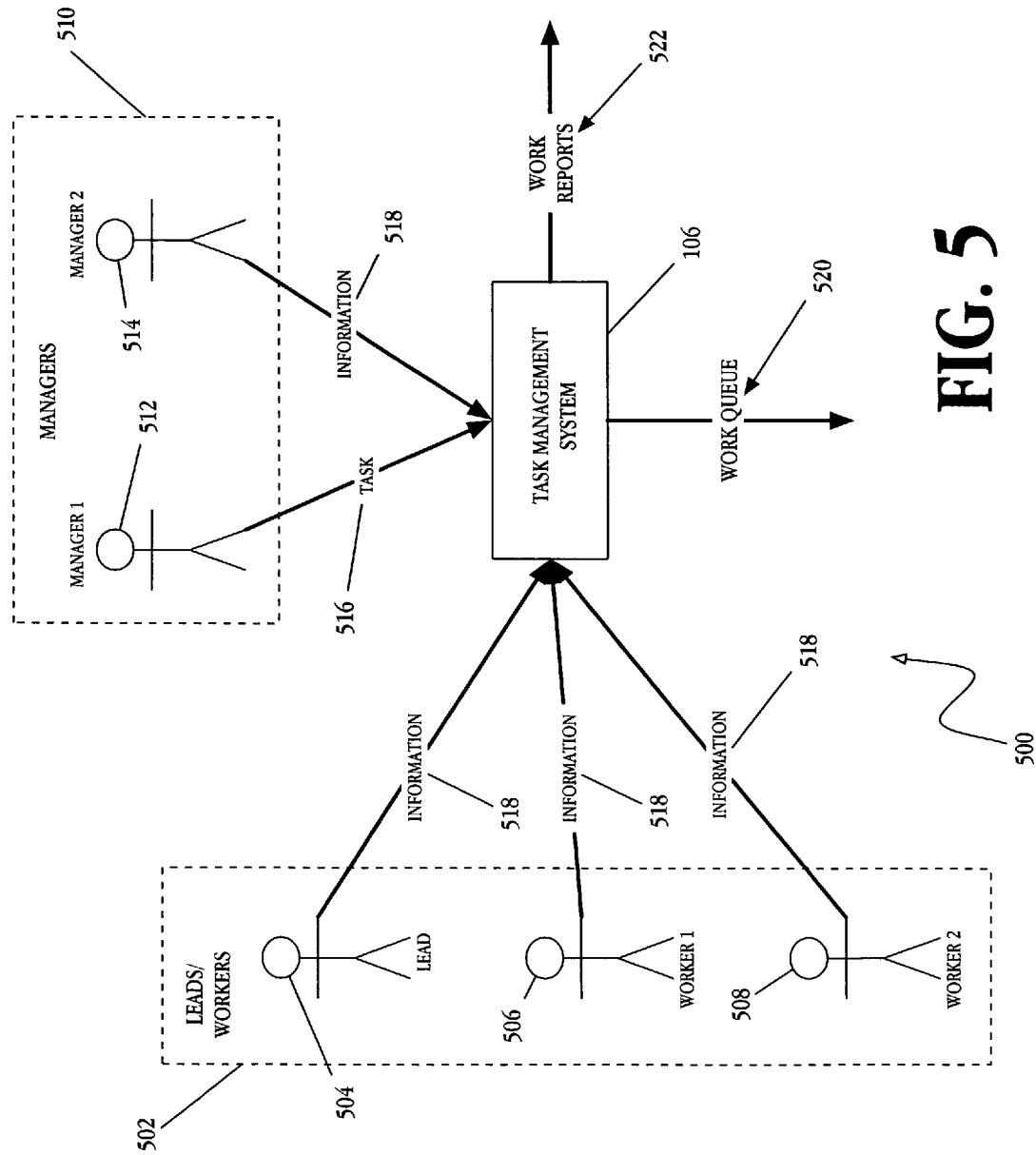
FIG. 5 shows a block diagram of a system of collaborative task management, in accordance with an example embodiment.

FIG. 5 shows a block diagram of a system of collaborative task management, in accordance with an example embodiment. Methods and apparatus for collaborative task management have been described above. In the present section, an example implementation will be described to further illustrate the apparatus and methods. This is not meant to be limiting in any manner, and only represents one arrangement of the apparatus previously described and one use of the methods.

In the example system 500, there are three leads/workers 502: lead 504, worker 1 506 and worker 2 508. The example system 500 also includes two managers 510: manager 1 512 and manager 2 514. As discussed above, the managers 510 in this example may only have managerial responsibilities for discrete project which requires them to interface with one or more leads/workers 502. The leads/workers 102 provide the manpower and knowledge to accomplish tasks that are managed by the task management system 106, in one example, and the managers 510 provide guidance as to which tasks are important and how they should be ranked. This is one example of the demarcation between leads/workers 502 and managers 510. However, as will be understood by one skilled in the art of project management or organizational management that the managers 510 are equally qualified to perform the tasks performed by the leads/workers 502, and may very well be assigned as a worker for a task. With that understanding, the present example will simplify the roles that leads/workers and managers play in order to better explain the system 500 in operation.

Manager 1 512 has a task 516 that needs to be completed, in this example. Using the new assignment form shown in FIG. 2D, manager 1 512 assigns the task to one or more leads/workers. In this example, the lead 504 is designated as the lead, with two support workers, worker 1 506 and worker 2 508. During the adding of the new assignment, manager 1 512 can assign a priority to the task. For this example, the priority ranking of the task is 1, so that this task takes precedence over any other task already in the system. The individual work queue for the lead 504 will be updated to note that the most important task for them is this new task. The lead 504 can open up the new task and investigate what it is, what the expected outcomes are, and what manager 1 512 has entered as the next steps for the task. The lead 504 can begin working on the task, and as they complete some of the next steps, they can update the record with new information 518. Manager 1 512 can read the entry, without ever interacting directly with the lead 504, and get an impression of the status of the task they have assigned. They can also use the task management system 106 to note how much time has been spent in support of the task and how much time may remain before completion. This information can be useful for manager 1 512 when interacting with other managers 510 about the productivity of the workgroup, or in discussions with executives as to the need for increased personnel.

Just as the lead 504 can supply information about the task, so can worker 1 506 and worker 2 508. Since each of these workers have been designated in support of the task, they should each enter what they have done and how much time they have taken to do those things as information 518 into the task management system 106. In one example, only the lead 504 can note in the task management system 106 that the task is complete. In an alternate example, either the lead 504 or any of the supporting workers can note that the task is complete. In yet another example, the lead 504 can complete their portion of the task and hand over the lead position to another worker. In such an example, the lead 504, through interaction with the task management system 106, can update the record for that task with the new lead information. In an alternate example, only manager 1 512 can update the record.

As shown in FIG. 5, there is an additional manager 514 who can interact with the task management system 106 for the management of the task 516. This can be done through viewing and updating the task priority screen shown in FIG. 2E, and may be done individually or in concert with manager 1 512. In the latter example, manager 1 512 and manager 2 514 may interact at a meeting to ensure that all tasks assigned to the workgroup are properly ranked. Manager 2 514 has no direct responsibility for the task 518 in this example, but can indicate that a task they do have direct responsibility for has higher priority. In such an example, Manager 2 514 indicates on the task priority screen the decreased ranking of the task 516. The task management system 106, upon receiving this indication, can update the work queues 520. The work queues 520 include both the workgroup work queue and individual work queues. The updated work queues can be delivered to the users in the workgroup as discussed above.

In addition to generating the work queues 520, the task management system 106 can also generate one or more work reports 522. These work reports 522 are data mined reports that can read a portion of the data maintained by the task management system 106 in the task data store 233. These data mined reports can provide to the managers 510 and/or to company executives in one example, indications as to the productivity of the workgroup or individuals, relative workloads along functional groupings of workers, and the like. Methods and results of data mining are well known in the art and are considered to be outside the scope of the present discussion except insofar as those techniques can be used on the data maintained by the task management system 106. The task management system 106 can also be configured to periodically deliver one or more of these work reports 522 to one or more managers 510 for review.

Figure 6:
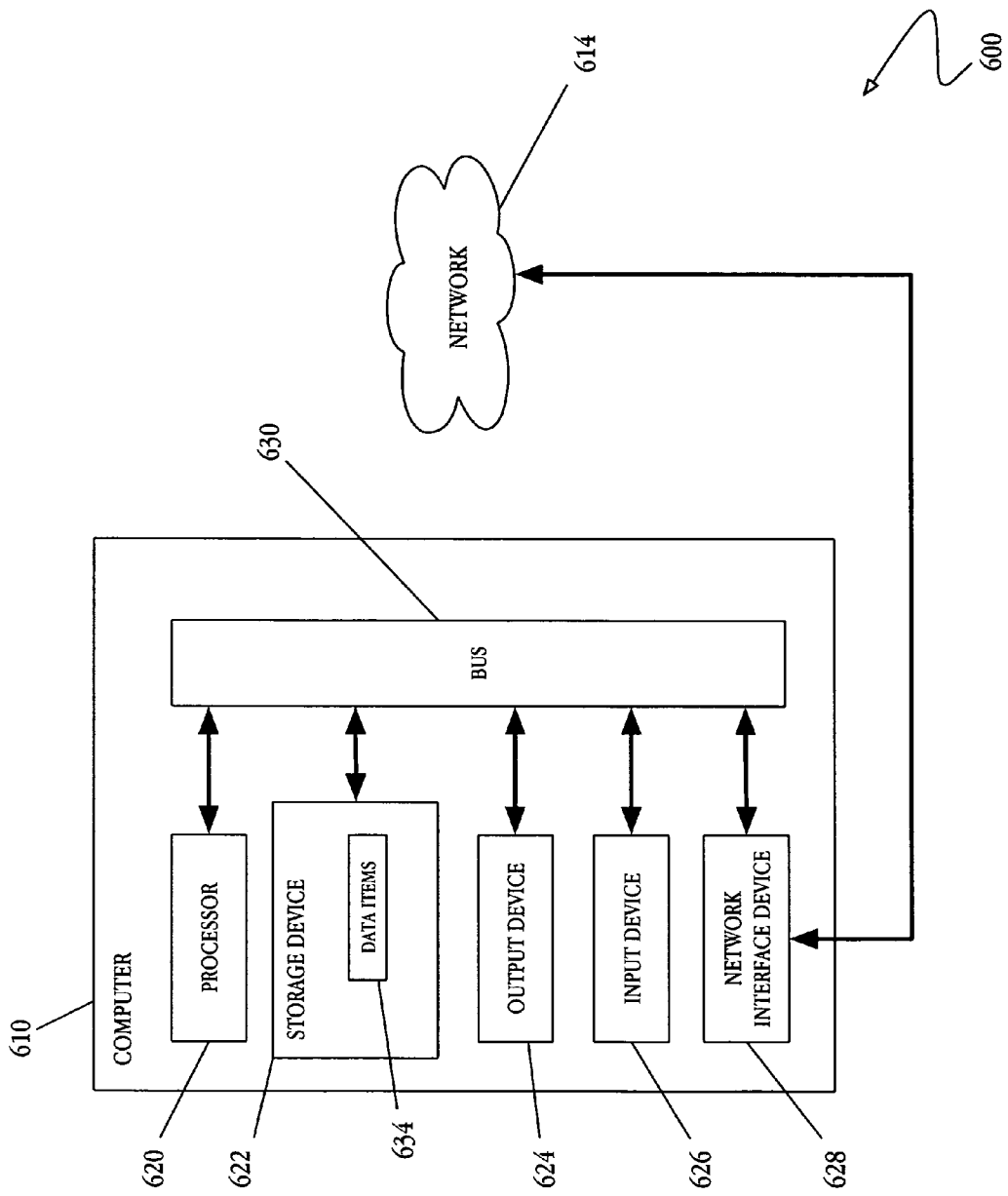
FIG. 6 shows a block diagram of a machine including instructions to perform any one or more of the methodologies described herein.

FIG. 6 shows a block diagram of a machine including instructions to perform any one or more of the methodologies described herein. A system 600 includes a computer 610 connected to a network 614. The computer 610 includes a processor 620, a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example stored on a server and accessed via the network 614.

The output device 624 is that part of the computer 610 that conveys output to the user, graphically or audibly. The output device 624 may be a liquid crystal display (LCD) well-known in the art of computer hardware. In other embodiments, the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface. In an alternate embodiment, the output device 624 is configured to audibly convey information to a visually-impaired user through any suitable means.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory machine-readable medium having machine-executable instructions to provide collaborative task management, the machine-executable instructions executed to:

provide a graphical user interface to a user, the graphical user interface capable of receiving task assignment information and to display a status of one or more tasks, wherein a task assignment includes the one or more tasks and the one or more tasks are performed by one or more users of one or more workgroups;

receive form data from a task data store, the form data sufficient to populate a task entry in the task data store;

schedule at least one task assignment of a plurality of task assignments;

prioritize the task assignment using at least a priority ranking of each of the one or more tasks;

store information related to the one or more tasks, the one or more users and one or more workgroups associated with the one or more users to the task data store;

receive approval of the priority ranking of each of the one or more tasks of the prioritized task assignment from a manager of the one or more workgroups having a responsibility to manage the one or more users according to a structure of the one or more workgroups;

generate one or more work queues comprising one or more prioritized task assignments for the one or more users responsive to receiving the approval of the priority ranking of each of the one or more tasks of the one or more prioritized task assignments;

provide a work queue to at least one of the one or more users;

receive an update to the at least one task assignment in the work queue from the at least one of the plurality of users;

receive approval of the update to the at least one task assignment in the work queue from the manager of the one or more workgroups; and re-prioritize the plurality of task assignments and re-generate the one or more work queues responsive to receiving the approval of the update to the at least one task assignment in the work queue.

2. The machine-readable medium of claim 1, further comprising machine-executable instructions executed to:

data mine the task data store and provide work reports to the one or more users.

3. The machine-readable medium of claim 2, wherein the work reports are provided to the users using a really simple syndication (RSS) feed.

4. The machine-readable medium of claim 2, wherein the work reports are provided to the users in an electronic message sent from the report engine to the one or more users.

5. The machine-readable medium of claim 1 further comprising machine-executable instructions executed to retrieve user information and pre-populate at least some of the task assignment information.

6. The machine-readable medium of claim 1 further comprising machine-executable instructions executed to retrieve user information and filtering selectable information by suppressing some of the selectable information using the user information.

7. The machine-readable medium of claim 1 further comprising machine-executable instructions executed to record the time that the user spends on the task assignment and records that time in the task entry related to the task assignment.

8. A non-transitory machine-readable medium having machine-executable instructions for collaborative task management contained therein, the machine-executable instructions executed to:

receive, from a user, a request to update a task assignment, wherein the task assignment includes one or more tasks performed by one or more users of a workgroup;

display, to the user, a task assignment form, the task assignment form having data entry fields for the user to enter information about the task assignment;

receive an indication from the user to process the task assignment form;

update a task data store with the information about the task assignment in a task record;

prioritize the task assignment based on a priority ranking associated with the task assignment;

receive approval of the priority ranking of the prioritized task assignment from a manager of the workgroup having a responsibility to manage the one or more users according to a structure of the workgroup;

generate one or more work queues using the information responsive to receiving the approval of the priority ranking of the prioritized task assignment;

deliver the generated one or more work queues to the one or more users, the one or more users including at least the user;

receive an update to the task assignment in the work queue from the at least one of the plurality of users;

receive approval of the update to the task assignment in the work queue from the manager of the workgroup; and re-prioritize the task assignment and re-generate the one or more work queues responsive to receiving the approval of the update to the task assignment in the work queue.

9. The machine-readable medium of claim 8, wherein the user is a lead/worker in a workgroup.

10. The machine-readable medium of claim 8 wherein the user is the manager of the workgroup.

11. The machine-readable medium of claim 8, wherein the information includes at least one of the following: task assignment name, status, priority, leads/workers, category, expected outcome, next steps, notes, dates and project initiator.

12. The machine-readable medium of claim 8, wherein the task assignment is a new task assignment.

13. The machine-readable medium of claim 8, wherein the machine-executable instructions executed to display include:

prepopulating some of the data entry fields with user-specific information, the user-specific information derived from user login information;

filtering one or more of selectable information using the user-specific information; and displaying, to the user, the task assignment form, the task assignment form having data entry fields for the user to enter information about the task assignment.

14. The machine-readable medium of claim 8, wherein the machine-executable instructions executed to update the task data store include:

dynamically assigning a priority ranking to the task assignment; and updating the task data store with the information about the task assignment in the task record and the dynamically assigned priority ranking.

15. A non-transitory machine-readable medium having machine executable instructions for collaborative task management contained therein, the machine-executable instructions executed to:

receive, from a plurality of users of a workgroup, task information, the task information detailing one or more aspects of at least one task assignment of a plurality of task assignments, wherein the at least one task assignment includes one or more tasks performed by the one or more users;

prioritize the plurality of task assignments using at least the task information;

receive approval of a priority ranking of the prioritized plurality of task assignments from a manager of the workgroup having a responsibility to manage at least one of the plurality of users according to a structure of the workgroup;

generate one or more work queues responsive to receiving the approval of the priority ranking of each of the prioritized plurality of task assignments;

provide a work queue to at least one of the plurality of users;

receive an update to at least one task assignment in the work queue from the at least one of the plurality of users;

receive approval of the update to the at least one task assignment in the work queue from the manager of the workgroup; and re-prioritize the plurality of task assignments and re-generate the one or more work queues responsive to receiving the approval of the update to the at least one task assignment in the work queue.

16. The machine-readable medium of claim 15, wherein the work queue is a workgroup work queue and the at least one of the plurality of users is the manager.

17. The machine-readable medium of claim 15, wherein the work queue is an individual work queue and the at least one of the plurality of users is a lead/worker.

18. The machine-readable medium of claim 15, further comprising machine-executable instructions executed to:

receive a request for a work report;

generate a work report responsive to the request; and deliver the work report.

19. The machine-readable medium of claim 18, wherein the request for the work report is received from an automated scheduling engine.

20. The machine-readable medium of claim 18, wherein the machine-executable instructions executed to deliver the work report includes sending an electronic message.

21. The machine-readable medium of claim 15, wherein the machine-executable instructions executed to prioritize the plurality of task assignments using at least the task information includes dynamically prioritizing, without further user input, the plurality of task assignments.

* * * * *